(12) United States Patent
Lebow et al.

(10) Patent No.: US 8,500,307 B2
(45) Date of Patent: Aug. 6, 2013

(54) DIRECTIONAL LAMBERTIAN OPTIC ILLUMINATION APPARATUS

(75) Inventors: Paul S Lebow, Annapolis, MD (US); Keith A Snail, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 819 days.

(21) Appl. No.: 12/559,595

(22) Filed: Sep. 15, 2009

(65) Prior Publication Data

US 2011/0063841 A1  Mar. 17, 2011

(51) Int. Cl.
*F21V 7/06* (2006.01)

(52) U.S. Cl.
USPC .................. 362/296.08; 362/296.07; 362/346

(58) Field of Classification Search
USPC .......... 362/241, 247, 296.05, 296.07, 296.08, 362/297, 298, 346, 347
See application file for complete search history.

(56) References Cited

U.S. PATENT DOCUMENTS

| | | | |
|---|---|---|---|
| 6,945,672 B2 * | 9/2005 | Du et al. | 362/247 |
| 7,828,448 B2 * | 11/2010 | Kim et al. | 362/241 |
| 2005/0276061 A1 * | 12/2005 | Repetto et al. | 362/346 |

* cited by examiner

*Primary Examiner* — Y My Quach Lee
(74) *Attorney, Agent, or Firm* — Amy L. Ressing; Kerry L. Broome

(57) ABSTRACT

A lighting apparatus is presented, having a Lambertian or quasi-Lambertian light source with an emitter side, as well as a reflector structure having an output side and a reflective surface with a concave parabolic contour that reflects light from the emitter side of the light source to provide Lambertian or quasi-Lambertian output light from the output side.

20 Claims, 8 Drawing Sheets

DIRECTIONAL LAMBERTIAN OPTIC ILLUMINATION APPARATUS

FIELD OF THE DISCLOSURE

The present disclosure relates generally to optical illumination and more particularly to apparatus for directional Lambertian optic illumination.

BACKGROUND

Lambertian illumination provides uniform radiance for different angles of observation such that all points of an illuminated area are uniformly illuminated from all directions. True Lambertian uniformity may not be achieved in some practical applications, but devices approaching such uniformity are termed "quasi-Lambertian". Planar Lambertian (or planar quasi-Lambertian) sources typically emit light of uniform intensity throughout a 180 degree angular dispersion pattern. In certain applications, however, it is desirable to reduce the angular extent of the Lambertian light, such as ship navigational lighting where a beacon needs to be restricted to a well-defined solid angle while retaining uniform brightness with angle (Lambertian) properties, as well as area lighting applications. Coupling light from a plane Lambertian or quasi-Lambertian emitter, such as an LED die, into a more restricted angular distribution can be done using obstructions, but such effectively reduce the energy efficiency of the device by wasting some of the generated light. Moreover, such techniques disrupt the Lambertian property whereby the output light does not exhibit the same uniformity over different viewing angles. Therefore, a need remains for improved techniques by which Lambertian or quasi-Lambertian light can be provided over a controlled dispersion angle.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Improved illumination apparatus is provided which includes a Lambertian (or quasi-Lambertian) light source with an emitter side, as well as a reflector structure having an output side and a reflective surface with a concave parabolic contour that reflects light from the emitter side of the light source to provide Lambertian or quasi-Lambertian output light from the output side. The disclosed apparatus allows control over the angular dispersion pattern while maintaining the Lambertian or quasi-Lambertian properties of the output light to facilitate providing a source of constant brightness with angle (Lambertian) over an angular range less than the usual 180 degrees. The disclosed embodiments also facilitate fabrication of an emitter including multiple independent sub-emitters with a combined Lambertian output having independently adjustable properties for each respective segment of the angular distribution (e.g. wavelength, pulse width, repetition rate, etc.), and also can be implemented as a structure with low thickness that scales with the width of the source.

One or more aspects of the disclosure provide a directional Lambertian lighting apparatus which includes a light source that emits Lambertian or quasi-Lambertian light from an emitter side, along with a reflector structure optically coupled to receive light emitted by the light source. The reflector structure includes an output side as well as a reflective surface having a concave parabolic contour in a plane perpendicular to the plane of the source, with the reflective surface located such that light from the emitter side of the source reflects off the reflective surface and exits the apparatus from the output side as Lambertian or quasi-Lambertian output light. Certain embodiments provide the output light having a distribution angle less than 180 degrees in a plane orthogonal to the output side, and in some embodiments the distribution angle is less than 90 degrees. In some embodiments, the source is located at a focus of the parabolic reflective surface with the emitter side facing at least a portion of the reflective surface, and in other embodiments the light source is spaced from the focus. The apparatus may include one or more sidewalls extending in a plane orthogonal to the output side along at least a portion of an edge of the reflective surface, and the sidewall in certain embodiments may have a reflective surface or a non-reflective surface.

Some embodiments of the apparatus may include first and second light sources each with an emitter side, along with first and second reflective surfaces individually having a concave parabolic contour, with the reflective surfaces located so that light from the corresponding emitter sides of the light sources reflects off the reflective surfaces and exits the apparatus from the output side as first and second portions of Lambertian or quasi-Lambertian output light. In some implementations, the first and second portions of output light each have a distribution angle of about 90 degrees or less in a plane orthogonal to the output side of the apparatus.

In other embodiments, a second reflector structure, such as an involute, is provided with a reflective surface having a cylindrical contour positioned to reflect light from the emitter side of the light source to the first reflective surface of the first reflector structure, to facilitate mounting of the source to the first reflective structure. In one implementation, the first reflector structure includes a generally planar substrate structure and the light source can be mounted to the substrate structure with the emitter side generally parallel to the substrate plane with the emitter side at least partially facing the reflective surface of the second reflector. The reflective surface of the second reflector structure in some embodiments has a contour with a generally constant radius extending through an angle of less than 180 degrees, such as about 90 degrees in one example, and the second reflector structure in some implementations is located at a focus of the first reflective surface.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

Figure 1A:
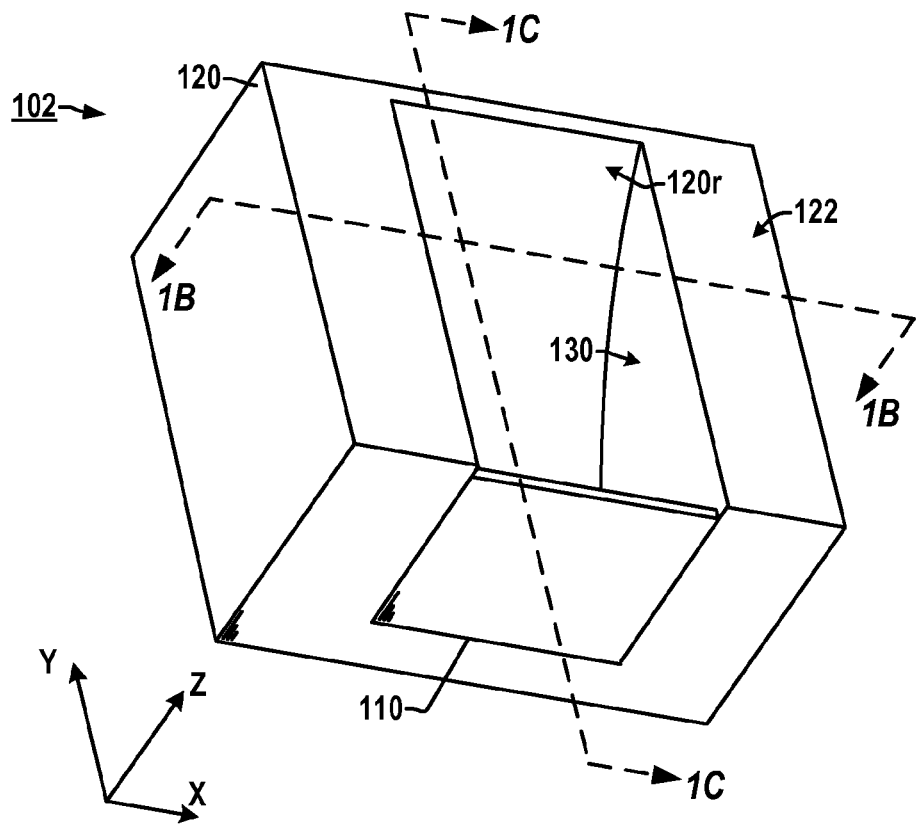
FIG. 1A is a perspective view illustrating an exemplary directional Lambertian lighting apparatus including a source and a reflector structure with parabolic reflective surface in accordance with various aspects of the present disclosure.

One or more embodiments or implementations are hereinafter described in conjunction with the drawings, where like reference numerals are used to refer to like elements throughout, and where the various features are not necessarily drawn to scale.

Figure 1B:
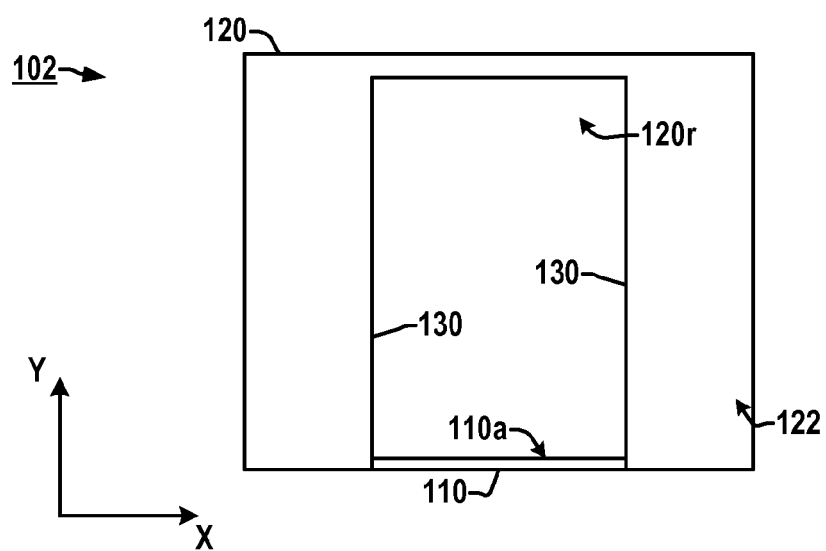
FIG. 1B is a front (output side) elevation view of the apparatus of FIG. 1A.
Figure 1C:
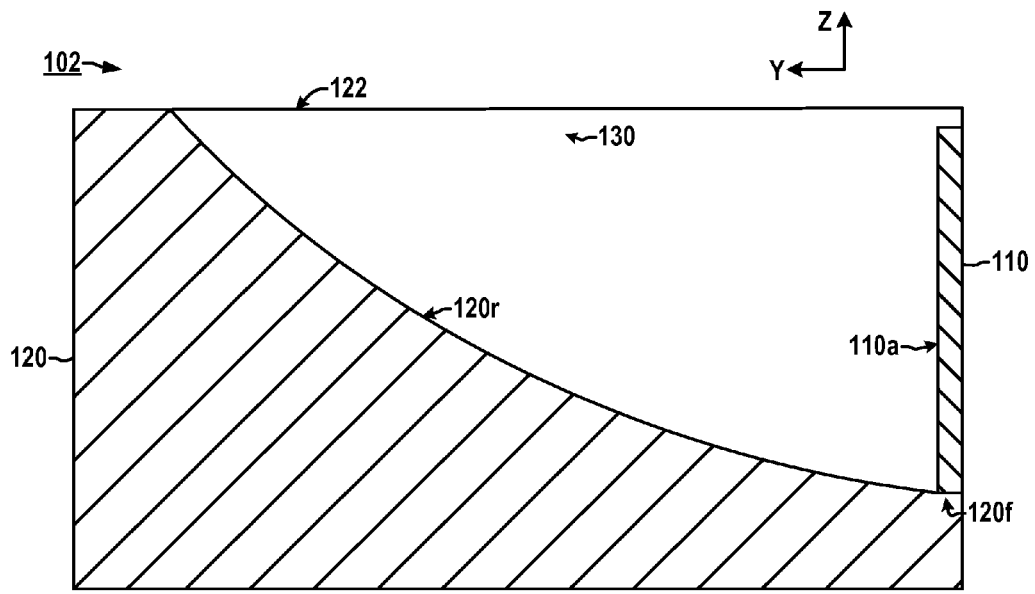
FIG. 1C is a partial sectional side elevation view of the apparatus taken along line 1C-1C in FIG. 1A.
Figure 1D:
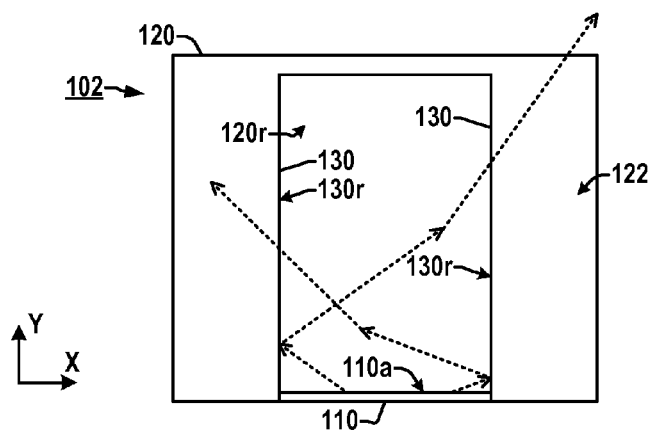
FIG. 1D is a front elevation view of an embodiment of the apparatus of FIGS. 1A-1C having opposing sidewalls with reflective sidewall surfaces illustrating exemplary reflected light ray paths in the apparatus.

Referring initially to FIGS. 1A-1G, an exemplary directional Lambertian lighting apparatus 102 is illustrated including a Lambertian (or quasi-Lambertian) light source 110 with an emitter side 110a facing at least a portion of a parabolic reflective surface 120r of a reflector structure 120. The apparatus 102 provides Lambertian or quasi-Lambertian output light 150 (FIG. 1E) over an angular dispersion range less than 180 degrees. As best shown in FIGS. 1A-1C, the light source 110 can be any suitable source of Lambertian or substantially Lambertian (quasi-Lambertian) light, such as an LED source, which has at least one emitter side 110a from which Lambertian or quasi-Lambertian light is emitted in operation. In the illustrated embodiments, the source 110 is a generally flat rectangular shape but other shapes may be used which have at least one side that emits Lambertian or quasi-Lambertian light. The apparatus also includes a first reflector structure 120, such as may be fashioned from any suitable material and which may be of any shape. In one example, the reflector structure 120 may be fashioned from an initially planer substrate structure, with a trough or other recessed portion being fabricated in the substrate to form a reflective surface 120r of parabolic contour in a plane perpendicular to the plane of the source 110. For example, as shown in FIG. 1C, the reflective surface 120r extends with a parabolic profile through a range from a focal line or point 120f at which the edge of the source 110 is located to a distal end. The reflective surface can be fashioned by any suitable techniques, such as by mechanical machining, chemical etching, chemical-mechanical polishing (CMP), coating, etc., or combinations of such techniques by which an optically reflective surface is created having at least a generally parabolic contour or profile.

The reflector structure 120 is optically coupled to receive light emitted by the light source 110, where the emitting side 110a in some embodiments may face all or a portion of the reflective surface 120r (FIGS. 1A-3B) or an intermediate reflection apparatus may be interposed in an optical path between the emitter side 110a and the first reflective surface 120r by which light from the source 110 is imparted (directly or through one or more reflections) on at least a portion of the reflective surface 120r. The reflector structure 120 can be a unitary structure as shown in the illustrated embodiments, or may be constructed as an assembly of multiple components. The structure 120 includes an output side 122 of any suitable form or shape that provides at least one outlet opening or aperture or other path by which output light 150 is emitted by the apparatus 102 directly or indirectly from the first reflective surface 120r.

In the example of FIGS. 1A-F, moreover, the first reflector structure 120 includes at least one sidewall 130 extending in a plane (e.g., the Y-Z in the figures) generally orthogonal to the output side 122 along at least a portion of an edge of the reflective surface 120r. In one implementation, the reflective surface 120r is created as a trough in a substrate structure 120 with the sidewalls 130 remaining from the initial substrate, but sidewall(s) 130 can be separately provided in other possible embodiments. The sidewalls 130 in the embodiment of FIG. 1D in particular themselves include a reflective inner surfaces 130r facing the parabolic first reflective surface 120r, allowing light rays from the Lambertian (or quasi-Lambertian) source 110 to reflect of the sidewall(s) 130 before ultimately exiting the apparatus 102 or reflecting thereafter off the first reflective surface 120r. In another embodiment shown in FIG. 1F, the sidewalls 130 include non-reflective inner surfaces 130n which do not reflect incident light received from the source 110. Another possible embodiment is shown in FIG. 1G in which no sidewalls are provided in the apparatus 102, in which some case light rays provided by the source 110 can escape the apparatus 102 without reflecting off the first reflective surface 120r.

Figure 1E:
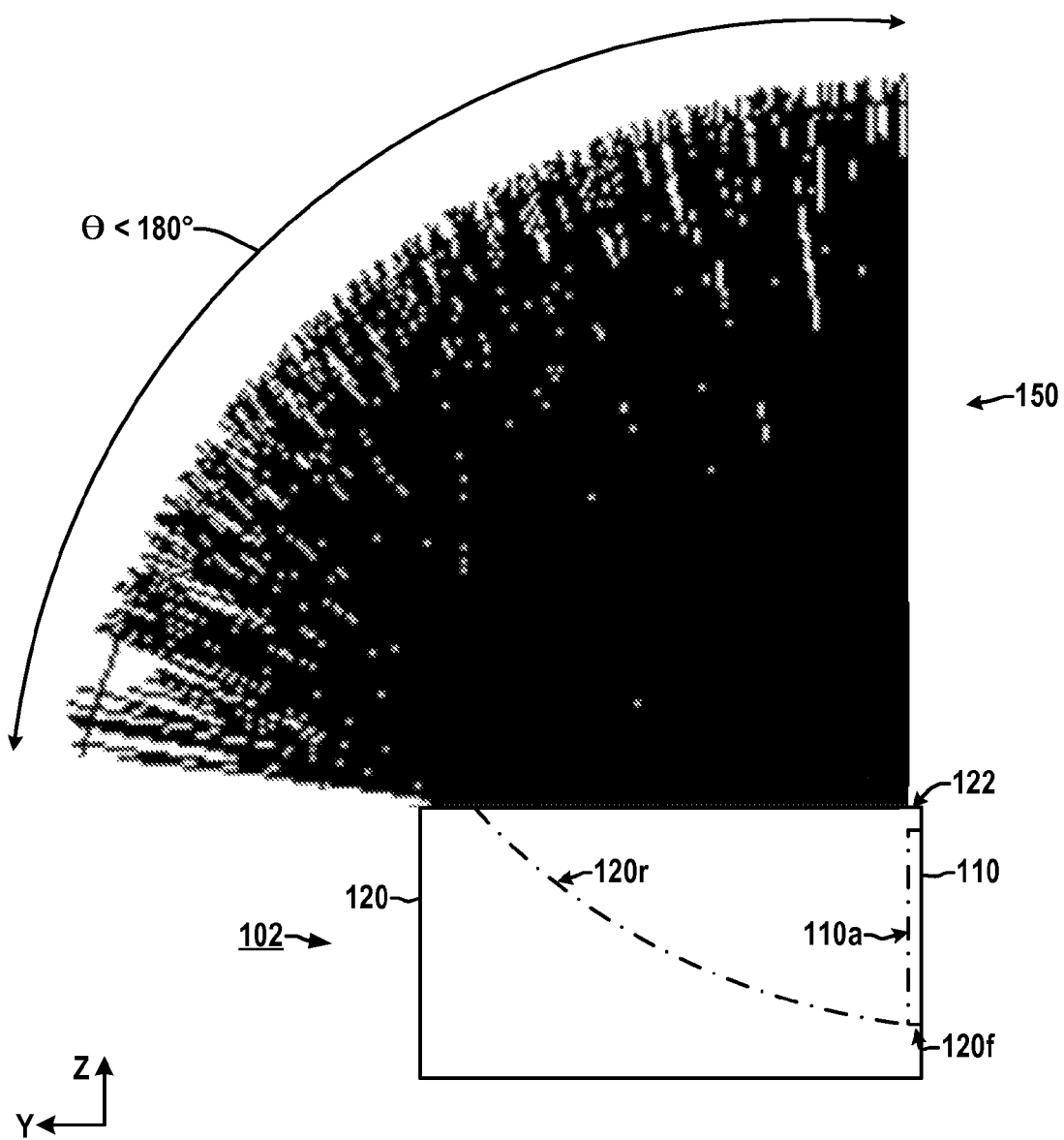
FIG. 1E is a side elevation view of the apparatus of FIGS. 1A-1D showing the Lambertian or quasi-Lambertian output light with a distribution angle less than 180 (or "equal to 90 degrees or less") degrees in a plane orthogonal to the output side.
Figure 1F:
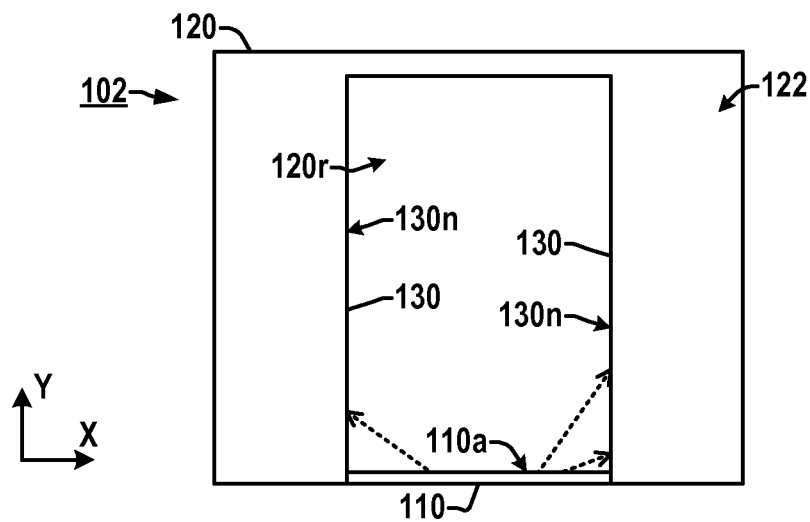
FIG. 1F is a front elevation view of another embodiment of the apparatus of FIGS. 1A-1C having opposing sidewalls with non-reflective sidewall surfaces.
Figure 1G:
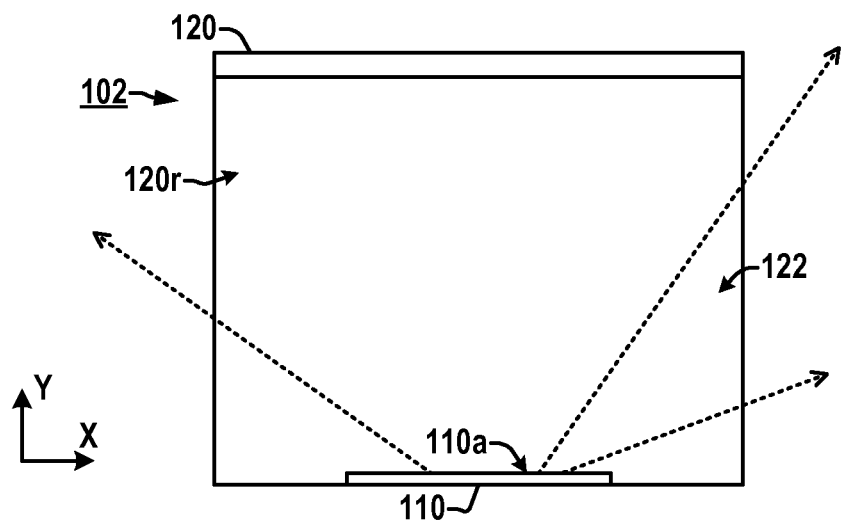
FIG. 1G is a front elevation view of yet another embodiment of the apparatus of FIGS. 1A-1C having no lateral sidewalls.
Figure 3A:
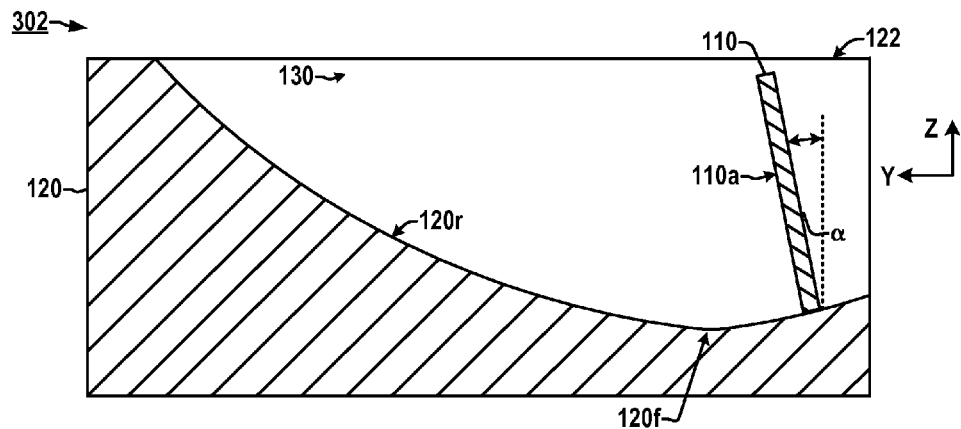
FIG. 3A is a partial sectional side elevation view of another lighting apparatus embodiment in which the light source is spaced from the focus of the parabolic reflective surface.
Figure 3B:
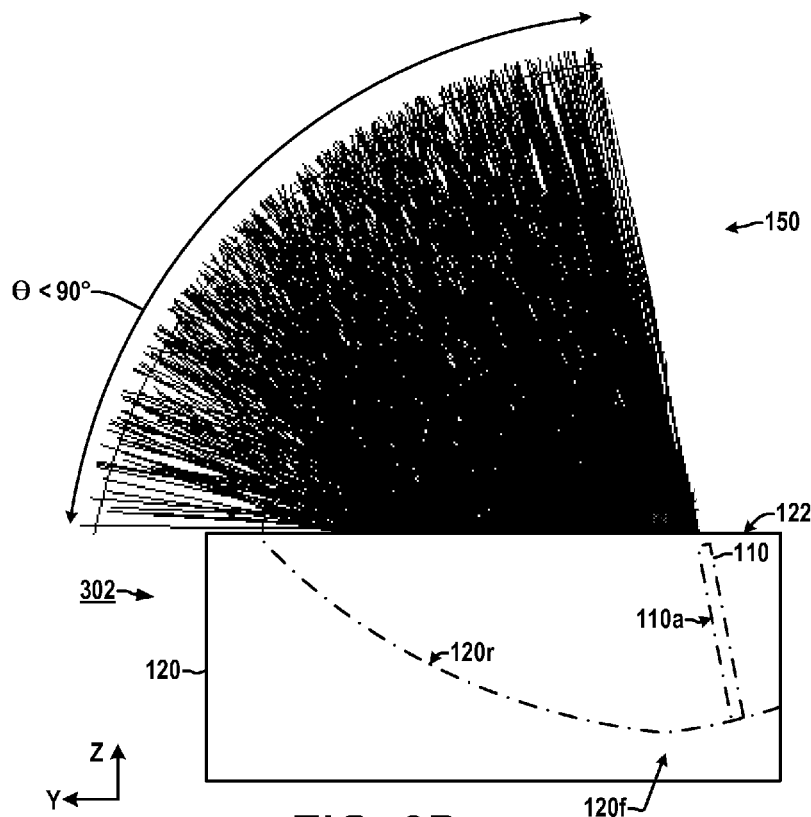
FIG. 3B is a side elevation view of the apparatus of FIG. 3A showing exemplary Lambertian or quasi-Lambertian output light with a distribution angle less than 90 degrees.

As shown in FIGS. 1C and 1E, the first reflective surface 120r provides a concave parabolic contour located relative to the light source 110 and the output side 122 of the lighting apparatus 102 such that light from the emitter side 110a of the light source 110 reflects off the first reflective surface 120r and exits the apparatus from the output side 122 as Lambertian or quasi-Lambertian output light 150. In this embodiment, the light source 110 is located at a focus 120f of the first reflective surface 120r (e.g., the plane containing a line from focal point to the vertex of the two dimensional parabolic contour) with the emitter side 110a facing at least a portion of the first reflective surface 120r, and the light source 110 does not extend in the Z direction farther than the edge of the parabolic surface 120r, although not a strict requirement of the present disclosure. In this embodiment, moreover, the Z-direction extent of the emitter side 110a of the source 110 relative to the parabolic extent of the surface 120r provides control over the angular dispersion angle θ of the Lambertian (or quasi-Lambertian) output light 150, as best shown in FIG. 1E, where the output light dispersion angle θ is less than the normal 180 degree extent of a planar Lambertian (or quasi-Lambertian) source 110 itself, and is equal to 90 degrees in the illustrated example. As shown in FIGS. 3A and 3B below, moreover, the location of the source 110 relative to the parabola focus 120f can be changed to change the angular dispersion 8 of the output light 150.

The embodiments of FIGS. 1A-1G utilize a trough design with a half-parabolic cross-section in the Y-Z plane in which the parabola begins at the vertex and extends to a point where it reaches the height of the focus 120f as measured from the vertex in the Z-direction, in combination with a rectangular LED source 110 mounted to the structure 120 in the X-Z plane with one side of the source length running along a line from the parabola vertex to the focus 120f on the Z-axis. The other dimension runs down the axis of the trough in the X direction. In the illustrated examples, the source is generally square, but this is not a requirement of the disclosure. The source 110 emits Lambertian or quasi-Lambertian light in the upper hemisphere in the +Y direction, and the length of the trough can vary and may include reflective end-caps. A ray emanating at the focus 120f will leave the reflective surface 120f generally parallel to the axis in the Y-direction, thus forming one edge-ray condition. Any other ray will leave the source 110 from a point within the focus and thus be reflected at an angle greater than 0 degrees from the parabolic axis with a maximum value of 90 degrees, in the Z-direction. Thus the pattern in the plane of the parabola is confined to a single Y-Z quadrant (e.g., 90 degrees or less). For the embodiment of FIG. 1G (no sidewalls), there is no confinement along the X-axis, thereby leaving a full 180 degree distribution in the X-Z and Z-Y planes.

Figure 2A:
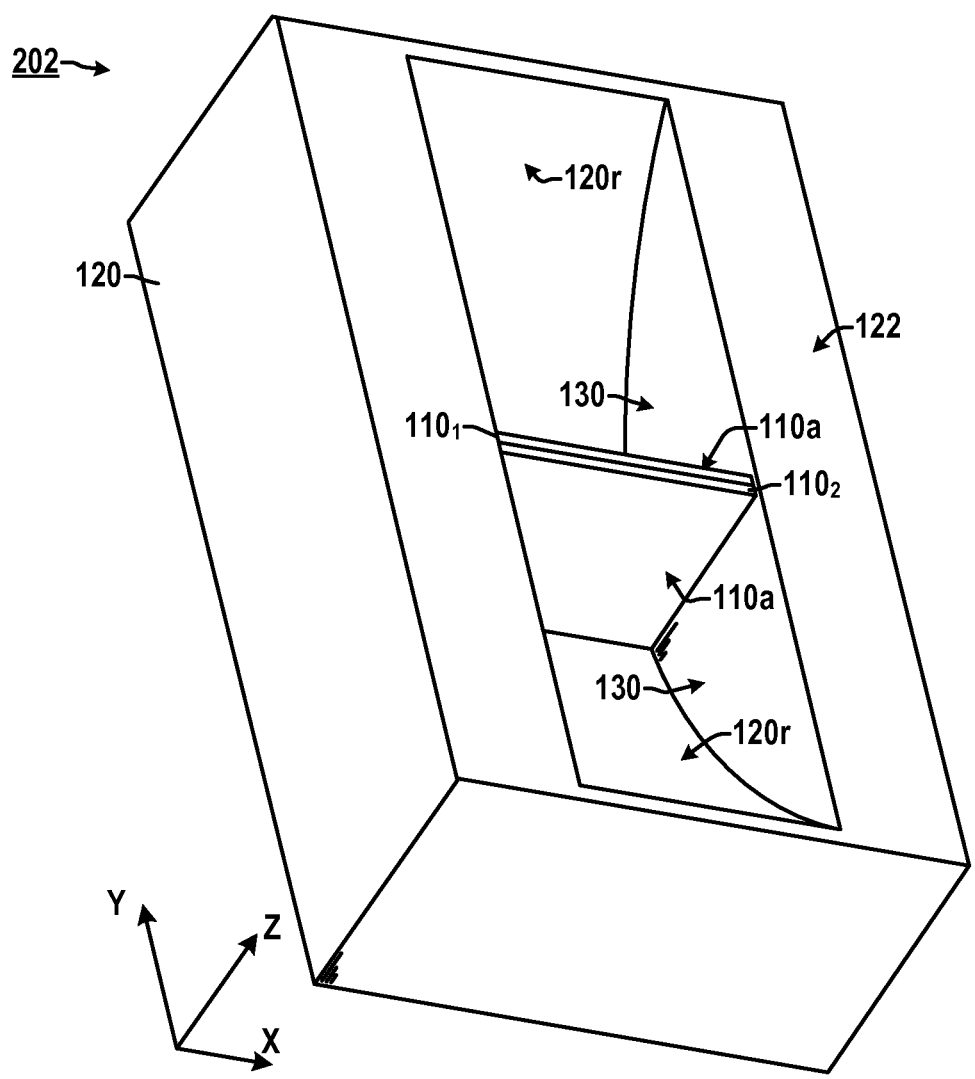
FIG. 2A is a perspective view illustrating another exemplary directional Lambertian lighting apparatus embodiment having two light sources each facing different parabolic reflective surfaces of the reflector structure to generate first and second portions of Lambertian or quasi-Lambertian output light.
Figure 2B:
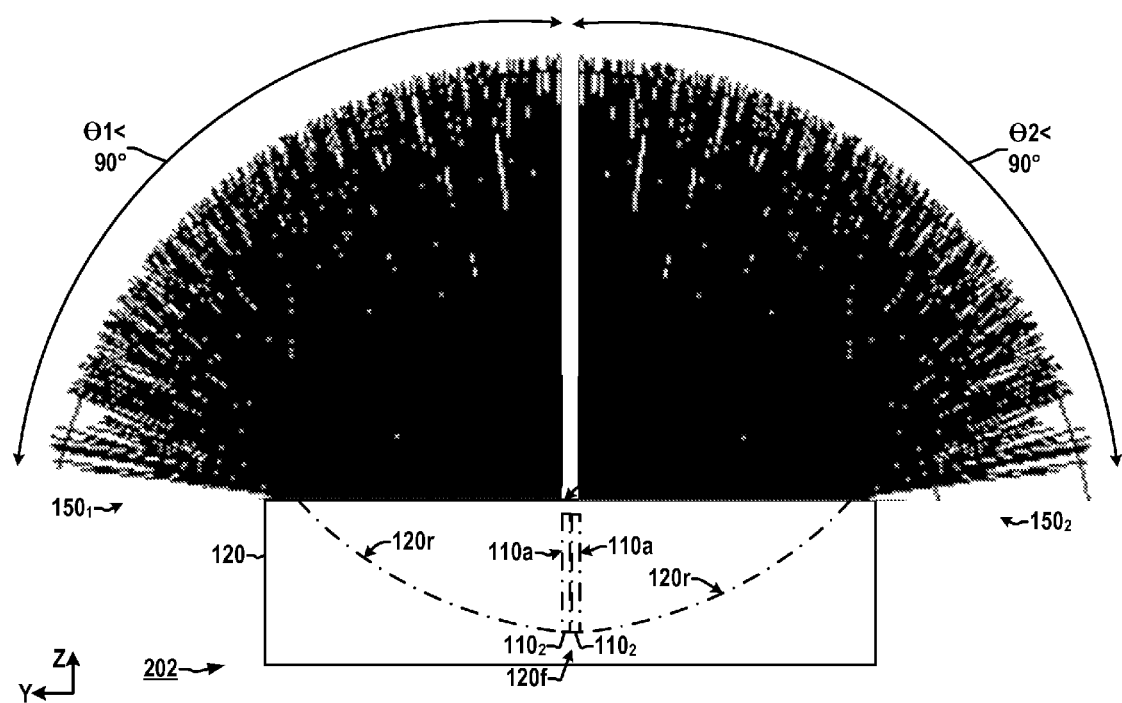
FIG. 2B is a side elevation view of the apparatus of FIG. 2A showing exemplary first and second portions of Lambertian or quasi-Lambertian output light each having a distribution angle of about 90 degrees or less.

FIGS. 2A and 2B show another exemplary embodiment of a directional Lambertian lighting apparatus 202 in which two light sources 110 are provided, each of which facing different parabolic reflective surfaces 120r of the reflector structure 120 to generate first and second portions $150_1$ and $150_2$ of Lambertian or quasi-Lambertian output light, where each portion $150_1$, $150_2$ has a distribution angle of about 90 degrees or less in the Y-Z plane orthogonal to the output side 122. Both the sources $110_1$, $110_2$ in this example have an emitter side 110a, and the first and second reflective surfaces 120r formed in the full parabola shaped trough in the substrate structure 120 provide a concave parabolic contour. In this example, the first and second reflective surfaces 120r are located relative to corresponding light source $110_1$, $110_2$ and the output side 122 such that light from the corresponding emitter sides 110a of the light sources $110_1$, $110_2$ reflects off the reflective surfaces 120r and exits the apparatus from the output side 122 as the first and second portions of Lambertian or quasi-Lambertian output light $150_1$, $150_2$. In this FIGS. 3A and 3B show another possible apparatus 302 in which the light source 110 is spaced from the focus 120f of the first reflective surface 120r with the emitter side 110a facing at least a portion of the first reflective surface 120r. This modification allows tailoring of the output light dispersion angle θ (θ can be further reduced) to accommodate any particular dispersion requirement of a given application for the apparatus 302. Another variant implementation is possible (not shown) by combining the concept of bifurcated or segmented trough design (FIGS. 2A and 2B above) with the spacing of the source 110 from the focus 120f (FIGS. 3A and 3B) by which a multi-source apparatus is provided with any desired angular dispersion angle θ for the individual sources, and wherein the angles θ need not be the same for each source.

Figure 4A:
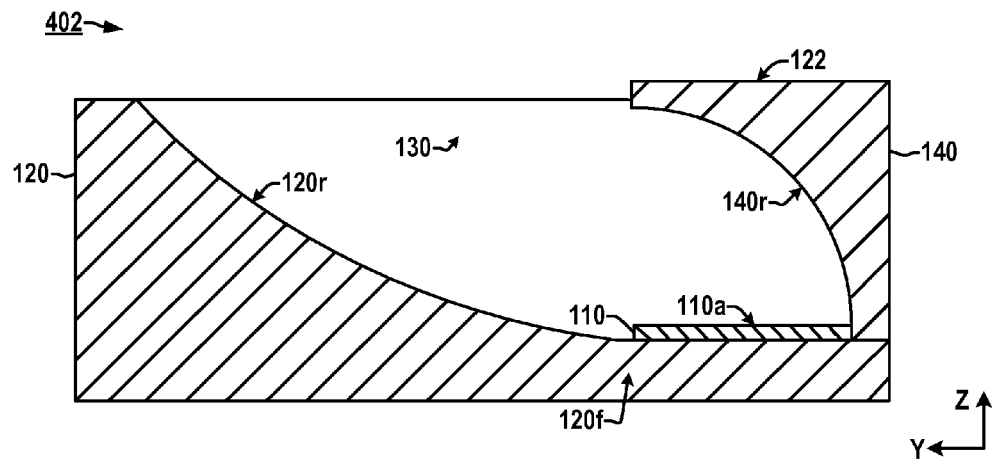
FIG. 4A is a partial sectional side elevation view of another lighting apparatus embodiment including a second reflector structure with a reflective surface positioned to reflect light from the emitter side of the light source to the reflective surface of the first reflector structure.
Figure 4B:
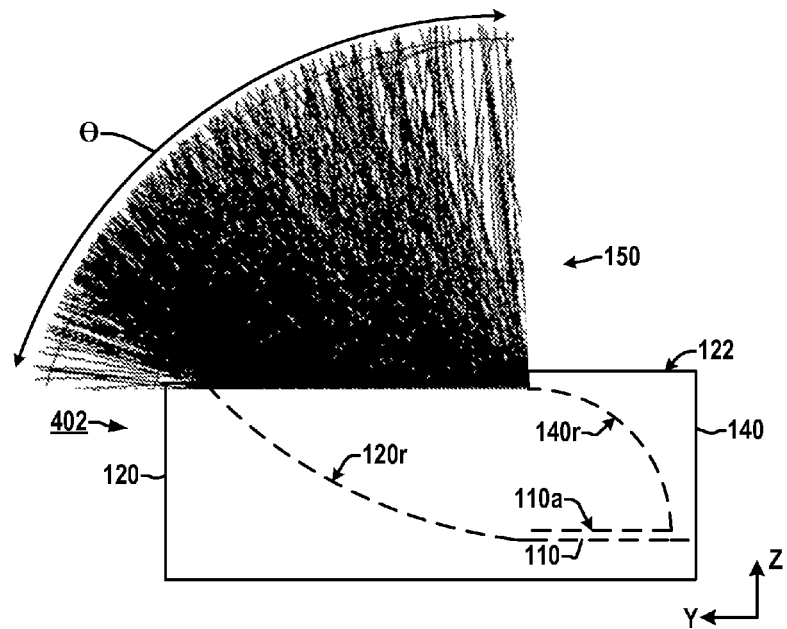
FIG. 4B is a side elevation view of the apparatus of FIG. 4A showing exemplary first and second portions of Lambertian or quasi-Lambertian output light each having a distribution angle of about 90 degrees or less.

Referring now to FIGS. 4A and 4B, yet another exemplary embodiment of a lighting apparatus 402 ariation #1 (FIG. 2) includes a second reflector structured 140 (e.g., an involute) having a reflective surface 140r positioned to reflect light from the emitter side 110a of the light source 110 to the first reflective surface 120r of the first reflector structure 120. The second structure 140 may be a separate structure or may be integral to the first reflector structure 120. The reflective surface 140r of the second reflector structure 140 in the illustrated embodiment has a cylindrical contour, but other contours are possible, such as having a constant radius. In the exemplary embodiment 402, moreover, the second reflector structure provides a quarter-circular cross-sectioned reflective surface 140r to essentially fold the optical path so the source 110 can be mounted 90 degrees lying flat on the substrate 120 with the emitter side 110a generally parallel to the substrate plane compared with the embodiment 102 of FIGS. 1A-1G above, where the edge-ray conditions and output light distribution remain the same. This apparatus 402 has advantages from a performance standpoint in terms of heat dissipation and ease of fabrication/assembly.

By using small cross-section sources 110 (e.g., LED emitters with cross-sections in the tens of microns), it is possible to fabricate an array for the purposes of illumination that have significant advantages over current conventional lighting using the above concepts, and the described apparatus 102, 202, 302, 402 allow the illumination distribution pattern of a specific thin light-emitting matrix design to be finely tailored via a specially designed optic 120 for each source element 110 in which the edge-rays from a 2-D Lambertian emitter 110 that extend over 180 degrees are transformed by the reflector 120 to a distribution having edge-rays limited to a 90 degree angular extent in a plane perpendicular to the axis of the trough.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:
1. A directional Lambertian lighting apparatus, comprising:

a light source including an emitter side, the light source operative to emit Lambertian or quasi-Lambertian light from the emitter side; and a first reflector structure optically coupled to receive light emitted by the light source, the first reflector structure including:

an output side, and a first reflective surface with a concave parabolic contour in a plane perpendicular to the plane of the source, the first reflective surface located relative to the light source and the output side such that light from the emitter side of the light source reflects off the first reflective surface and exits the apparatus from the output side as Lambertian or quasi-Lambertian output light.

2. The apparatus of claim 1, wherein the light source is located at a focus of the first reflective surface with the emitter side facing at least a portion of the first reflective surface.

3. The apparatus of claim 1, wherein the light source is spaced from a focus of the first reflective surface with the emitter side facing at least a portion of the first reflective surface.

4. The apparatus of claim 3, wherein the output light has a distribution angle less than 90 degrees in a plane orthogonal to the output side.

5. The apparatus of claim 1, wherein the output light has a distribution angle less than 180 degrees in a plane orthogonal to the output side.

6. The apparatus of claim 1, wherein the output light has a distribution angle less than 90 degrees in a plane orthogonal to the output side.

7. The apparatus of claim 1, further comprising at least one sidewall extending in a plane orthogonal to the output side along at least a portion of an edge of the reflective surface.

8. The apparatus of claim 7, wherein the sidewall has a reflective surface.

9. The apparatus of claim 1, comprising first and second light sources each having an emitter side, the reflector structure comprising first and second reflective surfaces individually having a concave parabolic contour, the first and second reflective surfaces located relative to corresponding ones of the first and second light sources and the output side such that light from the corresponding emitter sides of the light sources reflects off the reflective surfaces and exits the apparatus from the output side as first and second portions of Lambertian or quasi-Lambertian output light.

10. The apparatus of claim 9, wherein the first and second portions of output light each have a distribution angle of about 90 degrees or less in a plane orthogonal to the output side.

11. The apparatus of claim 1, further comprising a second reflector structure having a reflective surface positioned to reflect light from the emitter side of the light source to the first reflective surface of the first reflector structure.

12. The apparatus of claim 11, wherein the reflective surface of the second reflector structure has a cylindrical contour.

13. The apparatus of claim 11, wherein the first reflector structure comprises a generally planar substrate structure, wherein the light source is mounted to the substrate structure with the emitter side generally parallel to the substrate plane, and wherein the emitter side at least partially faces the reflective surface of the second reflector structure.

14. The apparatus of claim 13, wherein the reflective surface of the second reflector structure has a contour with a generally constant radius extending through an angle of less than 180 degrees.

15. The apparatus of claim 14, wherein the reflective surface of the second reflector structure has a cylindrical contour.

16. The apparatus of claim 14, wherein the second reflector structure is located at a focus of the first reflective surface with the reflective surface of the second reflector structure facing at least a portion of the first reflective surface.

17. The apparatus of claim 16, wherein the reflective surface of the second reflector structure has a contour with a generally constant radius extending through an angle of about 90 degrees.

18. The apparatus of claim 11, wherein the second reflector structure is located at a focus of the first reflective surface with the reflective surface of the second reflector structure facing at least a portion of the first reflective surface.

19. The apparatus of claim 18, wherein the reflective surface of the second reflector structure has a contour with a generally constant radius extending through an angle of about 90 degrees.

20. The apparatus of claim 18, wherein the reflective surface of the second reflector structure has a cylindrical contour.

* * * * *